(12) United States Patent
McCrary (10) Patent No.: US 11,977,933 B2
(45) Date of Patent: May 7, 2024

(54) GANG SCHEDULING WITH AN ONBOARD GRAPHICS PROCESSING UNIT AND USER-BASED QUEUES

(71) Applicant: ADVANCED MICRO DEVICES, INC., Santa Clara, CA (US)

(72) Inventor: Rex Eldon McCrary, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/721,434

(22) Filed: Dec. 19, 2019

(65) Prior Publication Data

US 2021/0191793 A1 Jun. 24, 2021

(51) Int. Cl.
*G06F 8/20* (2018.01)
*G06F 9/38* (2018.01)
*G06F 9/48* (2006.01)
*G06F 9/50* (2006.01)
*G06F 9/54* (2006.01)

(52) U.S. Cl.
CPC ............ *G06F 9/544* (2013.01); *G06F 9/3867* (2013.01); *G06F 9/4812* (2013.01); *G06F 9/4881* (2013.01); *G06F 9/5011* (2013.01); *G06F 9/546* (2013.01)

(58) Field of Classification Search
CPC ...... G06F 9/544; G06F 9/3867; G06F 9/4812; G06F 9/4881; G06F 9/5011; G06F 9/546
See application file for complete search history.

(56) References Cited

U.S. PATENT DOCUMENTS

| 10,133,597 | B2 * | 11/2018 | Tian | G06F 9/455 |
| 10,861,126 | B1 * | 12/2020 | Sharma | G06F 9/4881 |
| 2004/0187122 | A1 * | 9/2004 | Gosalia | G06F 9/5016 718/100 |
| 2012/0188258 | A1 * | 7/2012 | Mccrary | G06F 9/545 345/502 |
| 2018/0114290 | A1 * | 4/2018 | Paltashev | G06T 15/005 |

(Continued)

OTHER PUBLICATIONS

Maysoon A. Mohammed et al "Queueing Theory Study of Round Robin versus Priority Dynamic Quantum Time Round Robin Scheduling Algorithms" (Year: 2015).*

(Continued)

*Primary Examiner* — Kevin L Young
*Assistant Examiner* — Abdou K Seye (57) ABSTRACT

A processing unit such as a graphics processing unit (GPU) includes a set of queues that stores command buffers prior to execution in a corresponding plurality of pipelines. The processing unit also implements a kernel mode driver that allocates a first subset of the set of queues to a first application in response to receiving registration requests from the first application. The processing unit further includes a scheduler that schedules command buffers in the first subset of the set of queues for concurrent execution on a first subset of the set of pipelines. In some cases, an interrupt is generated in response to execution of a first command in a first command buffer in the first queue or the second queue. The interrupt includes an address indicating a location of a routine to be executed by a second subset of the plurality of pipelines.

18 Claims, 6 Drawing Sheets

(56) References Cited

U.S. PATENT DOCUMENTS

2018/0300841 A1* 10/2018 Schluessler .............. G06T 1/20
2018/0374118 A1* 12/2018 Lv ...................... G06F 12/1009
2019/0286479 A1*  9/2019 Tian ...................... G06F 9/455
2020/0192676 A1*  6/2020 Pearce ................. G06F 9/5038
2020/0379815 A1* 12/2020 Banerjee .............. G06F 9/5038

OTHER PUBLICATIONS

Yash Ukidave et al. ("Runtime Support for Adaptive Spatial Partitioning and Inter-Kernel Communication on GPUs", (Year: 2014).*

* cited by examiner

GANG SCHEDULING WITH AN ONBOARD GRAPHICS PROCESSING UNIT AND USER-BASED QUEUES

BACKGROUND

The physical resources of a graphics processing unit (GPU) include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders. These arrangements are usually specified by a graphics application programming interface (API) processing order such as specified in specifications of Microsoft DX 11/12 or Khronos Group OpenGL/Vulkan APIs. Each virtual pipeline supported by the GPU is fed via one or more queues (sometimes referred to as user queues) that hold commands that are to be executed in the virtual pipeline and a context that defines the operational state of the virtual pipeline. Some embodiments of the queues are implemented as ring buffers using a head pointer and a tail pointer. The commands are grouped into command buffers that include a predetermined number of commands such as draw commands or compute commands that are provided to the GPU by a corresponding central processing unit (CPU). The draw commands include state information or geometry data associated with vertices of primitives. The compute commands include kernel code or a reference (such as a pointer or an index) to code, arguments, barriers, and the like.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Virtual pipelines in a graphics processing unit (GPU) concurrently execute commands from command buffers in queues associated with the virtual pipelines. However, dependencies between the commands in different queues causes serialization of the processing performed by the virtual pipelines. For example, if different virtual pipelines are executing command buffers A and B that include commands that are dependent upon the results of one or more commands in a command buffer C that is executing on another virtual pipeline, the command buffers A and B are not scheduled for execution until after the command buffer C has completed. However, the dependency between the commands in the command buffers A, B, and C is often resolved before the command buffer C is fully complete. For example, the application that generates the commands that populate the command buffers A, B, and C executes correctly as long as the command buffers A and B in their corresponding virtual pipelines are delayed by a short time interval (or bubble) relative to execution of the command buffer C. The duration of the bubble is typically much shorter than the time required to complete execution of a command buffer. Delaying execution of the command buffers A and B until a boundary of the command buffer C therefore reduces performance of the virtual pipelines. Decreasing the sizes of the command buffers increases concurrency between the virtual pipelines by reducing the granularity of command buffers and the time consumed executing each command buffer. However, the concurrency gains come at the cost of the increased overhead of switching contexts more frequently.

FIGS. 1-7 disclose embodiments of techniques that increase the performance of a GPU that provides multiple queues for corresponding virtual pipelines by allowing applications to own a group of queues that are scheduled together (e.g., gang scheduled) for execution on a corresponding set of virtual pipelines. As used herein, the phrase "gang scheduling" refers to concurrently scheduling command buffers generated by a single application or process from multiple queues for concurrent execution on corresponding virtual pipelines. In some embodiments, an application provides a registration request for each queue that is included in the group of queues that are gang scheduled. The queues are allocated to a group for gang scheduling in response to the registration requests and each registration request includes a group identifier. Queues that are allocated in response to registration requests including the same group identifier are added to the same group of queues. A scheduler in the GPU schedules command buffers in the group of queues for concurrent execution on the corresponding set of virtual pipelines.

In some embodiments, the allocation of queues to the group (or other groups associated with the application) is modified in response to requests generated by the application. For example, a kernel mode driver can switch a queue from one group to another group in response to a request from the application. In some embodiments, the group of queues is reconfigured in response to requests generated by the application. For example, a kernel mode driver can modify priorities of one or more of the queues in the group of queues in response to a request from the application. The group of queues is allocated to the application for a time quantum and the application relinquishes the group of queues at the end of the time quantum or in response to the group of queues becoming empty. In some embodiments, one or more commands in the command buffers from the group of queues generates an interrupt including an address that indicates another routine to be executed by one or more of the virtual pipelines. The interrupt is provided to the scheduler, which uses the address to access a data structure indicating the other routine. In some embodiments, the other routine generates registration requests for another group of queues that share a group identifier. The GPU therefore supports multi-level or hierarchical gang scheduling.

Figure 1:
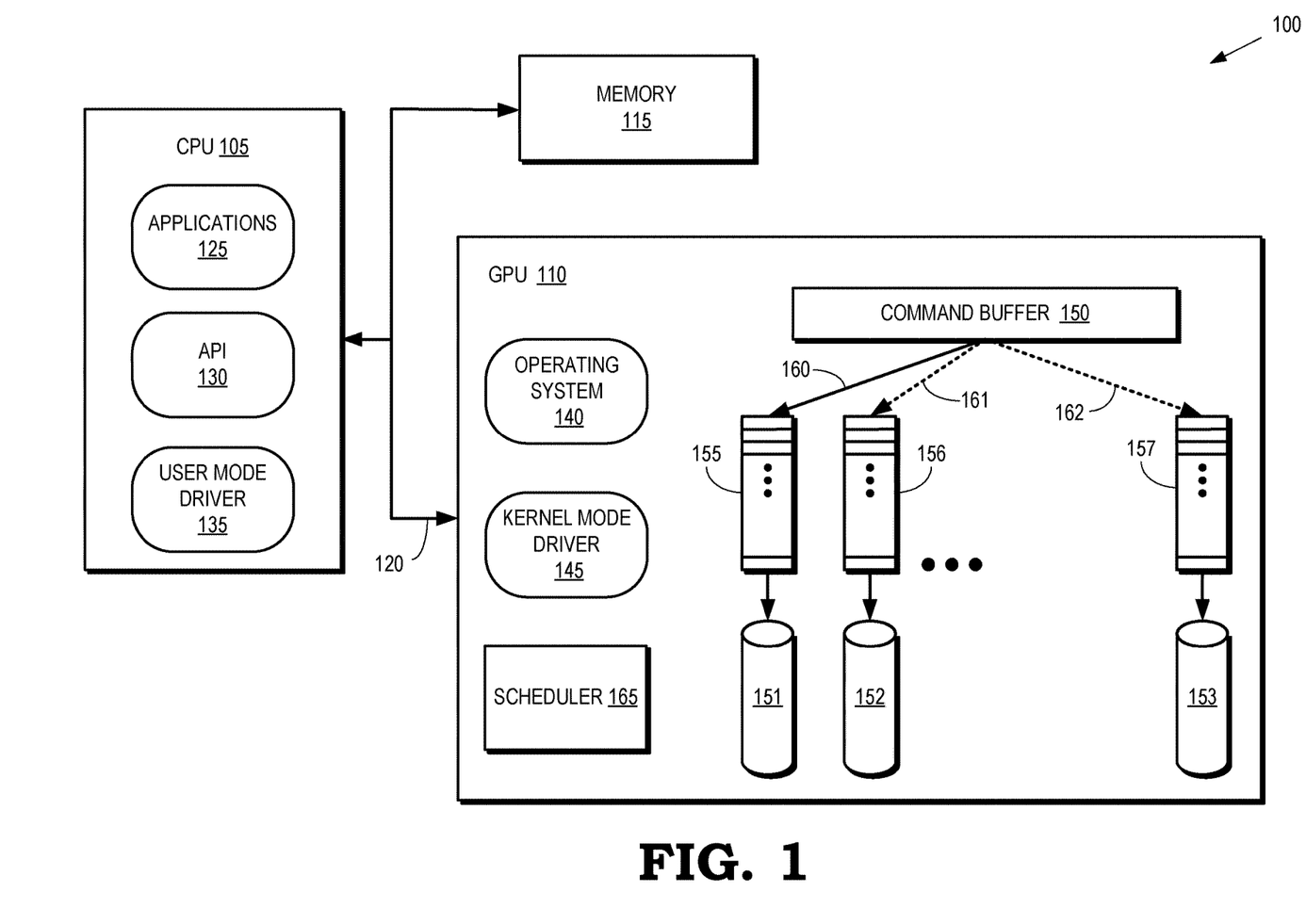
FIG. 1 is a block diagram illustrating a processing system that implements gang scheduling of user queues according to some embodiments.

FIG. 1 is a block diagram illustrating a processing system 100 that implements gang scheduling of user queues according to some embodiments. The processing system 100 includes a central processing unit (CPU) 105 for executing instructions such as draw calls and a graphics processing unit (GPU) 110 for performing graphics processing and, in some embodiments, general purpose computing. The processing system 100 also includes a memory 115 such as a system memory, which is implemented as dynamic random access memory (DRAM), static random access memory (SRAM), nonvolatile RAM, or other type of memory. The CPU 105, the GPU 110, and the memory 115 communicate over an interface 120 that is implemented using a bus such as a peripheral component interconnect (PCI, PCI-E) bus. However, other embodiments of the interface 120 are implemented using one or more of a bridge, a switch, a router, a trace, a wire, or a combination thereof.

As illustrated, the CPU 105 executes a number of processes, such as one or more applications 125 that generate graphics commands. The applications 125 include applications that utilize the functionality of the GPU 110, such as applications that generate work that is transmitted to the GPU 110 via the interface 120. Some embodiments of the application 125 include one or more graphics instructions that instruct the GPU 110 to render a graphical user interface (GUI), a graphics scene, or other image or combination of images for presentation to a user. For example, the graphics instructions can include instructions that define a set of one or more graphics primitives to be rendered by the GPU 110.

Some embodiments of the application 125 utilize a graphics application programming interface (API) 130 to invoke a user mode driver 135 or other driver. User mode driver 135 issues one or more commands to the GPU 110. The commands instruct the GPU 110 to render one or more graphics primitives into displayable graphics images. Based on the graphics instructions issued by the application 125 to the user mode driver 135, the user mode driver 135 formulates one or more graphics commands that specify one or more operations for the GPU 110 to perform for rendering graphics or other general-purpose computing. In some embodiments, the user mode driver 135 is a part of the application 125 running on the CPU 105. For example, a gaming application running on the CPU 105 can implement the user mode driver 135. Similarly, some embodiments of an operating system running on the CPU 105 implement a kernel mode driver (not shown).

The GPU 110 includes one or more processors that implement an operating system (OS) 140 and a kernel mode driver 145 that execute in a kernel mode of operation. The OS 140 and the kernel mode driver 145 share a virtual address space when the GPU 110 is operating in the kernel mode. Applications execute on the GPU 110 in a user mode and each application is allocated a separate private virtual address space. Each application therefore runs in isolation, independently of the other applications executing in the user mode.

The GPU 110 receives command buffers 150 (only one is shown in FIG. 1 in the interest of clarity) from the CPU 105 via the interface 120. The command buffer 150 includes sets of one or more commands for execution by one of a plurality of concurrent graphics pipelines 151, 152, 153, which are collectively referred to herein as "the pipelines 151-153." Queues 155, 156, 157 (collectively referred to herein as "the queues 155-157") are associated with the pipelines 151-153 and hold command buffers for the corresponding pipelines 151-153. In the illustrated embodiment, the command buffer 150 is stored in an entry of the queue 155 (as indicated by the solid arrow 160), although other command buffers received by the GPU 110 are distributed to the other queues 156, 157 (as indicated by the dashed arrows 161, 162). The command buffers are distributed to the queues 155-157 using a round-robin algorithm, randomly, or according to other distribution algorithms.

One or more of the queues 155-157 are allocated to received command buffers 150 for an application. Gang scheduling is used to schedule command buffers 150 concurrently from multiple queues 155-157 if more than one queue is allocated to a single application. Some embodiments of the kernel mode driver 145 allocate subsets of the queues 155-157 to an application in response to receiving multiple registration requests from the application. For example, the kernel mode driver 145 allocates a first queue 155 to an application in response to receiving a first registration request from the application. The first registration request includes a group identifier. The kernel mode driver 145 then allocates a second queue 156 to the application in response to receiving a second request from the application that also includes the group identifier. The registration/allocation process is iterated to add more queues to the subset, if necessary.

A scheduler 165 schedules command buffers from the head entries of the queues 155-157 for execution on the corresponding pipelines 151-153. If multiple queues are allocated to a single application, the scheduler 165 gang schedules command buffers 150 from the multiple queues. For example, if a subset of the queues 155-157 including the queues 155, 156 is allocated to an application, the scheduler 165 gang schedules command buffers 150 from the queues 155, 156 for concurrent execution on the virtual pipelines 151, 152. In some embodiments, gang scheduling includes introducing predetermined delays (or bubbles) between the command buffers 150 that are scheduled from the subset of the queues 155-157 on the corresponding subset of the virtual pipelines 151-153. The predetermined delays (or bubbles) are indicated by the application, e.g., to provide time for dependencies to resolve without having to wait for an entire command buffer to complete execution.

Figure 2:
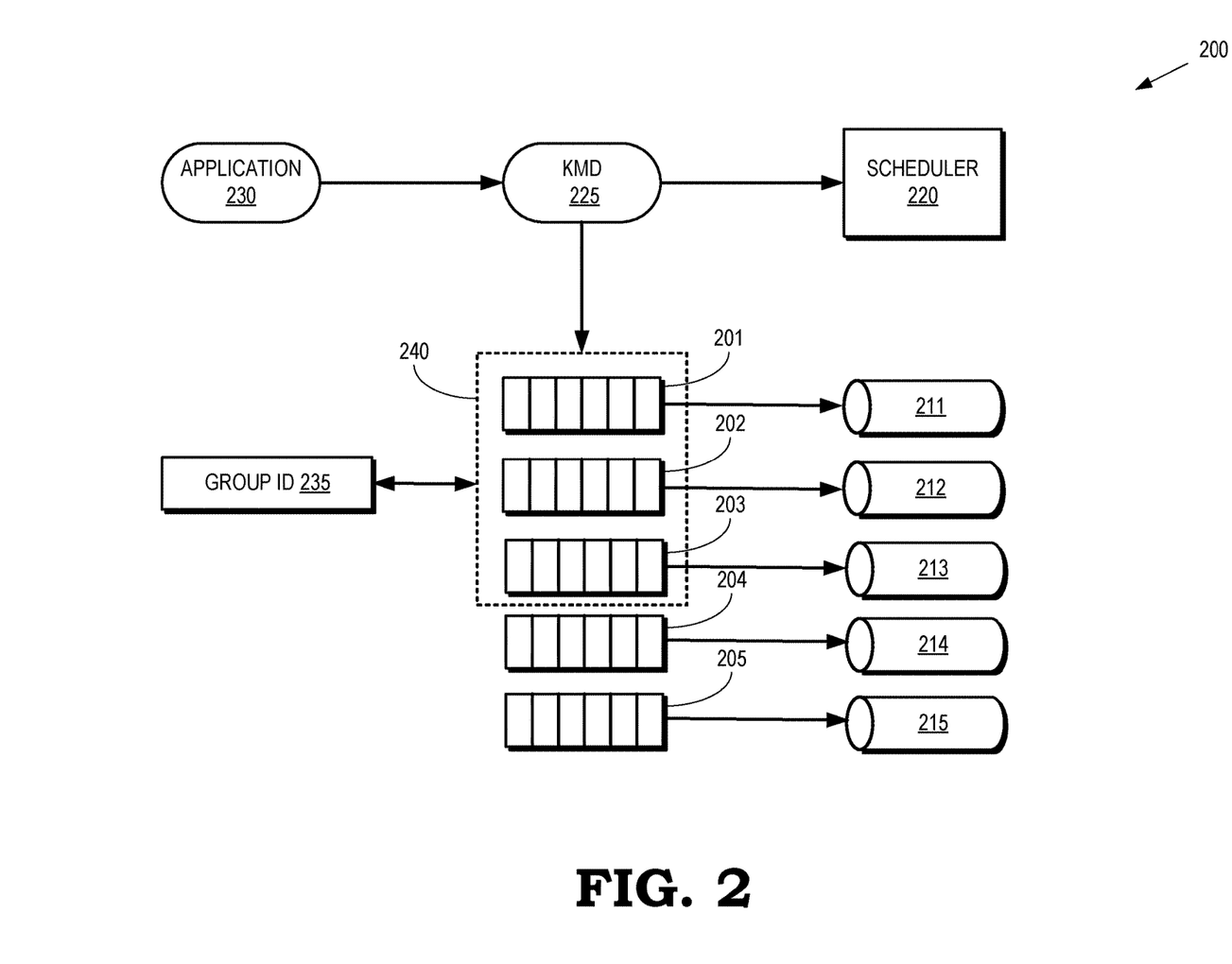
FIG. 2 is a block diagram of a graphics processing unit (GPU) that supports gang scheduling of user queues according to some embodiments.

FIG. 2 is a block diagram of a GPU 200 that supports gang scheduling of user queues according to some embodiments. The GPU 200 is used to implement some embodiments of the GPU 110 shown in FIG. 1. The GPU 200 includes user queues 201, 202, 203, 204, 205 (collectively referred to herein as "the user queues 201-205"), virtual pipelines 211, 212, 213, 214, 215 (collectively referred to herein as "the virtual pipelines 211-215"), and a scheduler 220. The GPU 200 also includes a kernel mode driver 225 that is implemented using one or more processors, compute units, or processor cores. The kernel mode driver 225 receives requests and command buffers from an application 230 such as the application 125 shown in FIG. 1.

The application 230 requests allocation of a group or subset of the user queues 201-205 by transmitting one or more registration requests to the kernel mode driver 225. In some embodiments, the application 230 transmits a registration request for each of the user queues 201-205 that are allocated to the subset. The registration requests include a copy of a group identifier 235 that identifies the subset of the user queues 201-205. For example, the application 230 requests allocation of a subset 240 that includes the user queues 201-203 by transmitting a first request that includes a group identifier 235. In response to receiving the first request, the kernel mode driver 225 allocates the queue 201 to the application 230. The application 230 then transmits a second request that also includes the group identifier 235. In response to receiving the second request, the kernel mode driver 225 allocates the queue 202 to the application 230 and includes the queues 201, 202 in the subset 240 that is identified by the group identifier 235. The application 230 then transmits a third request that includes the group identifier 235. In response to receiving the third request, the kernel mode driver 225 allocates the queue 203 to the application 230 and adds the queue 203 to the subset 240.

The scheduler 220 gang schedules command buffers from the queues 201-203 in the subset 240. The command buffers from the queues 201-203 therefore execute concurrently on the corresponding virtual pipelines 211-213. In some embodiments, the application 230 transmits additional types of requests to configure or reconfigure the subset 240. For example, the application 230 transmits a modification request to remove one of the queues 201-203 from the subset 240. The modification request can also include information identifying a different subset and a request to add a removed queue to the different subset. For another example, the application 230 transmits a reconfiguration request to reconfigure one or more priorities associated with the subset 240. The reconfiguration request can include information indicating a lower or higher priority for the subset 240.

Figure 3:
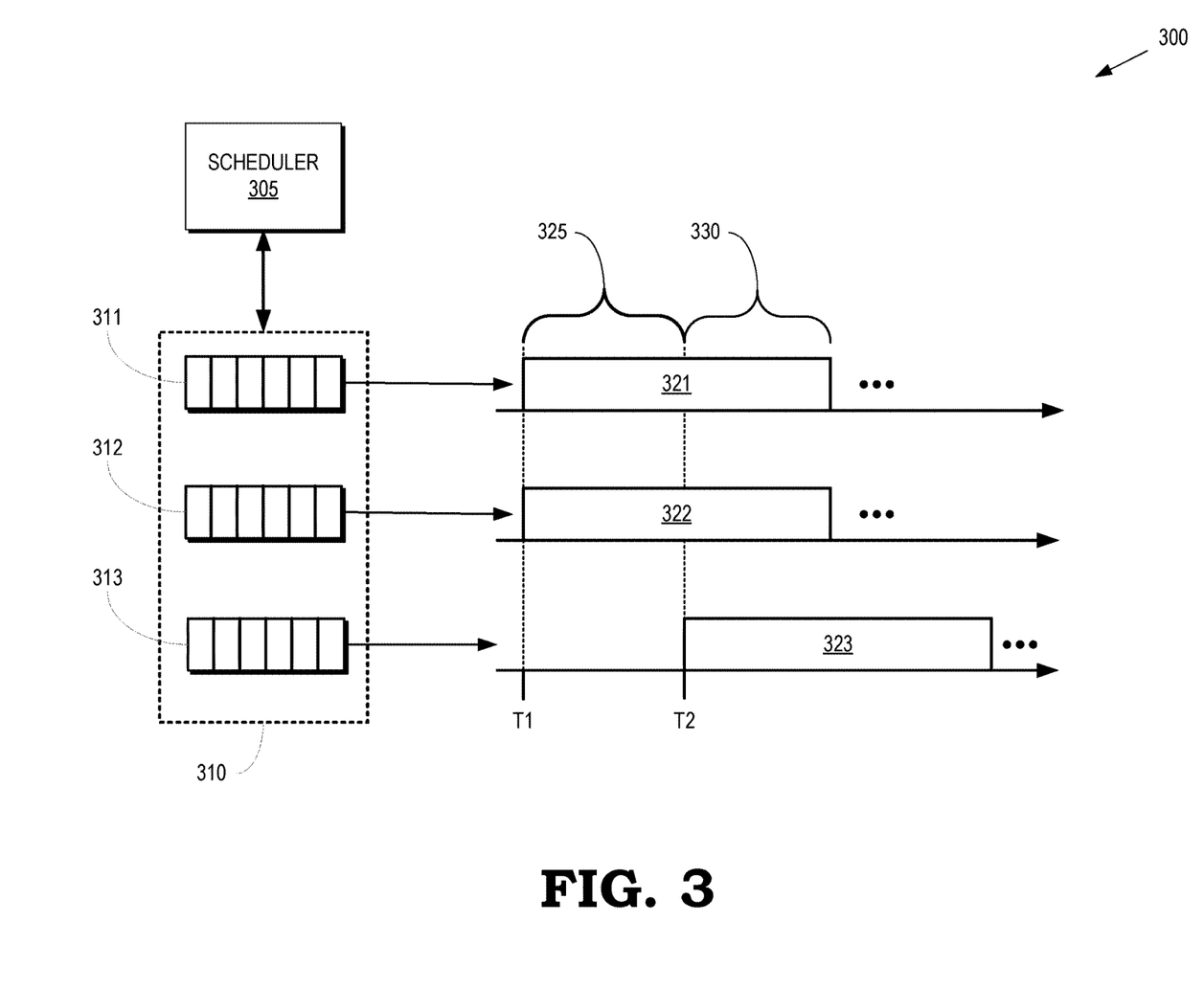
FIG. 3 is a block diagram of a portion of a GPU that implements gang scheduling of a group of user queues associated with an application according to some embodiments.

FIG. 3 is a block diagram of a portion 300 of a GPU that implements gang scheduling of a group of user queues associated with an application according to some embodiments. The portion 300 is used to implement some embodiments of the GPU 110 shown in FIG. 1 and the GPU 200 shown in FIG. 2. The portion 300 includes a scheduler 305 and a group 310 of user queues 311, 312, 313, which are collectively referred to herein as "the user queues 311-313." The user queues 311-313 in the group 310 are allocated to the same application, e.g., the user queues 311-313 are associated with a group identifier of the group 310. The scheduler 305 therefore performs gang scheduling for command buffers that are provided to the user queues 311-313 by the application.

In the illustrated embodiment, the application instructs or configures the scheduler 305 to schedule command buffers 321, 322, 323 from the different user queues 311-313 for dispatch or execution at different times. For example, the command buffers 321, 322 are scheduled for dispatch at a first time T1 and the command buffer 323 is scheduled for dispatch at a second time T2, which is delayed relative to the first time T1 by a predetermined delay time interval 325. Delaying the command buffer 323 relative to the command buffers 321, 322 provides time for dependencies between the command buffer 323 and the command buffers 321, 322 to resolve before the command buffer 323 is executed by the GPU. The command buffers 321-323 are executed concurrently by corresponding virtual pipelines, as indicated by the overlapping time interval 330.

Figure 4:
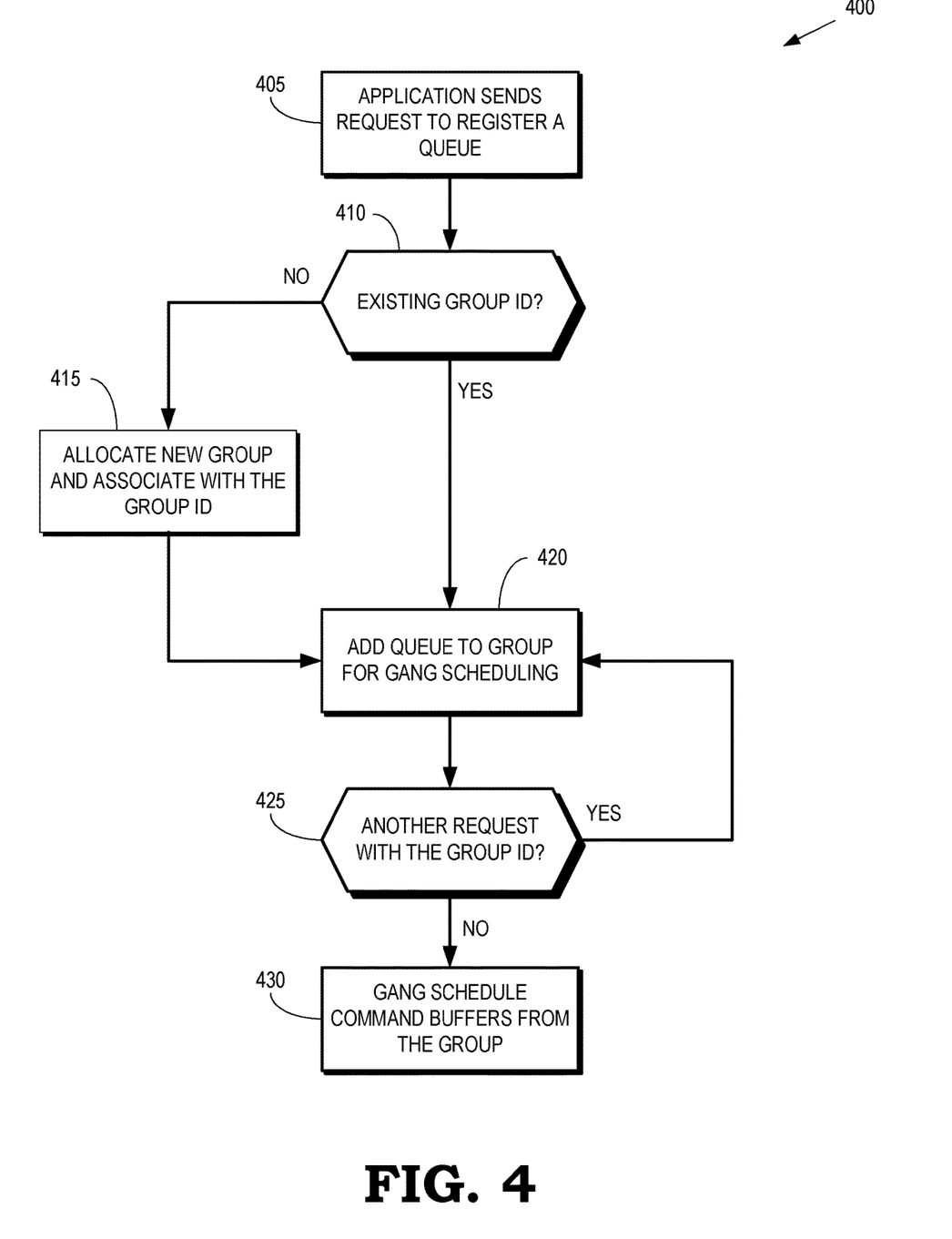
FIG. 4 is a flow diagram of a method of allocating multiple queues to an application for gang scheduling according to some embodiments.

FIG. 4 is a flow diagram of a method 400 of allocating multiple queues to an application for gang scheduling according to some embodiments. The method 400 is implemented in some embodiments of the processing system 100 shown in FIG. 1 and the GPU 200 shown in FIG. 2.

At block 405, an application provides a request to register a queue for allocation to the application. The registration request includes a group identifier that identifies a group of queues that are allocated to the application.

At decision block 410, a kernel mode driver determines whether the group identifier in the registration request is already being used to identify a group that includes one or more queues. If not, the method 400 flows to block 415 and the kernel mode driver allocates a new group to the application. The kernel mode driver also associates the group identifier in the registration request with the newly allocated group. If the kernel mode driver determines that the group identifier is already associated with an existing group, the method 400 flows to block 420.

At block 420, the kernel mode driver allocates a queue to the application in response to the registration request and adds the queue to a group for gang scheduling. The group is indicated by the group identifier in the registration request.

At decision block 425, the kernel mode driver determines whether another registration request including the group identifier has been received from the application. If so, the method 400 flows back to block 420 for allocation of another queue to the application and addition of the queue to the group indicated by the group identifier. This process iterates until all registration requests including the group identifier have been received from the application. The method 400 then flows to block 430 in response to the kernel mode driver determining that no additional registration requests including the group identifier have been received from the application.

At block 430, the scheduler begins gang scheduling command buffers from the queues in the group indicated by the group identifier.

Figure 5:
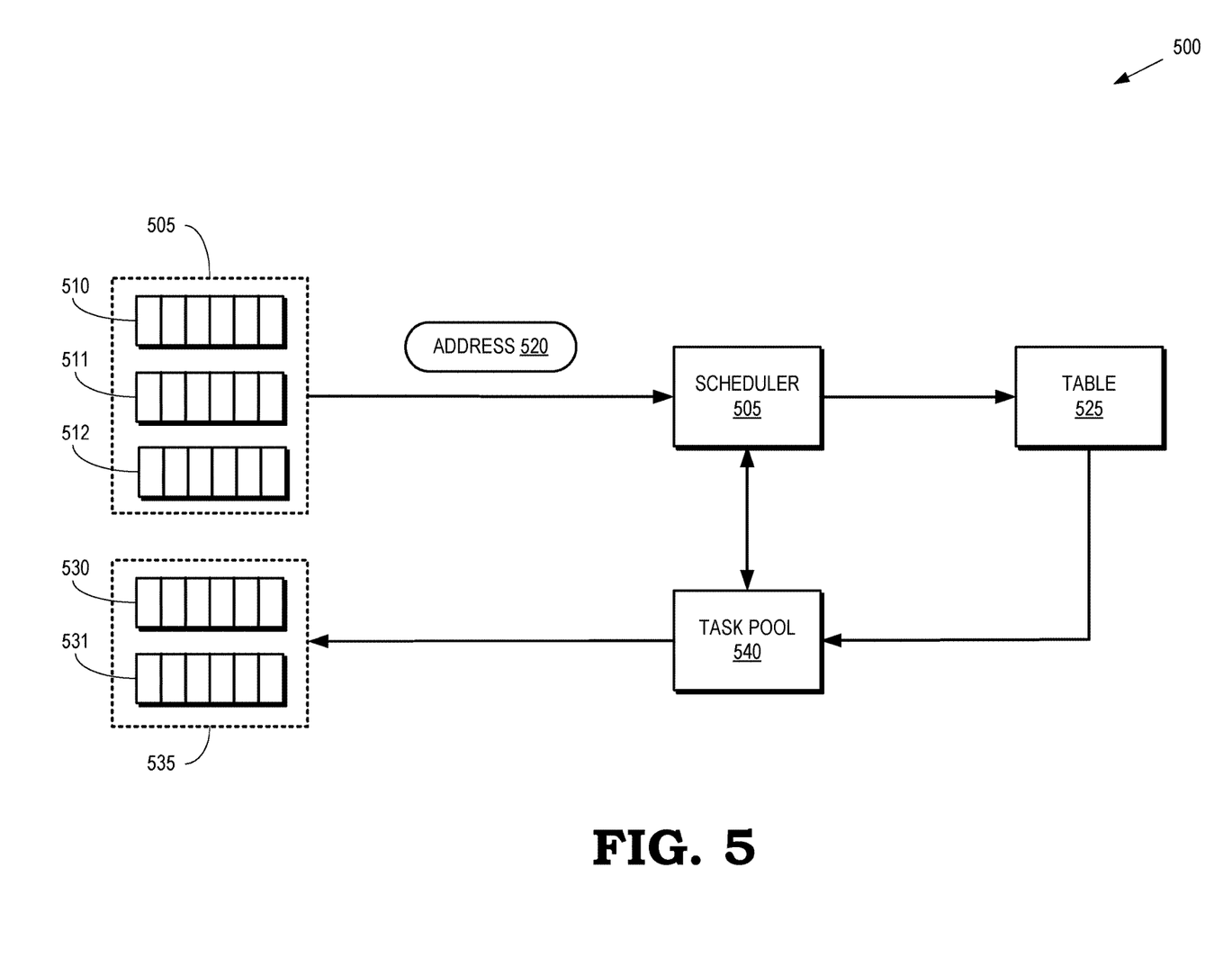
FIG. 5 is a block diagram of a portion of a GPU that performs redirection to support hierarchical gang scheduling according to some embodiments.

FIG. 5 is a block diagram of a portion 500 of a GPU that performs redirection to support hierarchical gang scheduling according to some embodiments. The portion 500 is used to implement some embodiments of the GPU 110 shown in FIG. 1 and the GPU 200 shown in FIG. 2. The portion 500 includes a scheduler 505 that gang schedules queues 510, 511, 512 (collectively referred to herein as "the queues 510-512") in a group 515 that is indicated by a group identifier.

One of the queues 510-512 generates an interrupt including an address 520 that indicates a memory location corresponding to a routine that is to be executed by the GPU. The memory location stores a data structure such as a table 525 that includes information that is used to launch tasks that are executed using other subsets of the available user queues that are gang scheduled by the scheduler 505. The tasks are executed concurrently with execution of the command buffers in the gang scheduled queues 510-512. In the illustrated embodiment, the information stored in the table 525 initiates registration of queues 530, 531 in a group 535 that is indicated by a group identifier. For example, registration of the queues 530, 531 into the group 535 can be performed using registration request messages including the group identifier, as discussed herein with regard to FIG. 4.

The queues 510-512 in the group 505 and the queues 530, 531 in the group 535 represent a hierarchy of dependent groups of queues. In the illustrated embodiment, the queues 530, 531 are dependent on the queues 510-512. The tasks indicated by the table 525 are added to a task pool 540 that is scheduled by the scheduler 505, e.g., by scheduling command buffers associated with the task that are stored in the queues 530, 531. The scheduler 505 gang schedules command buffers from the queues 530, 531 and, in some cases, gang scheduling of the queues 530, 531 is performed concurrently with gang scheduling of the queues 510-512.

Figure 6:
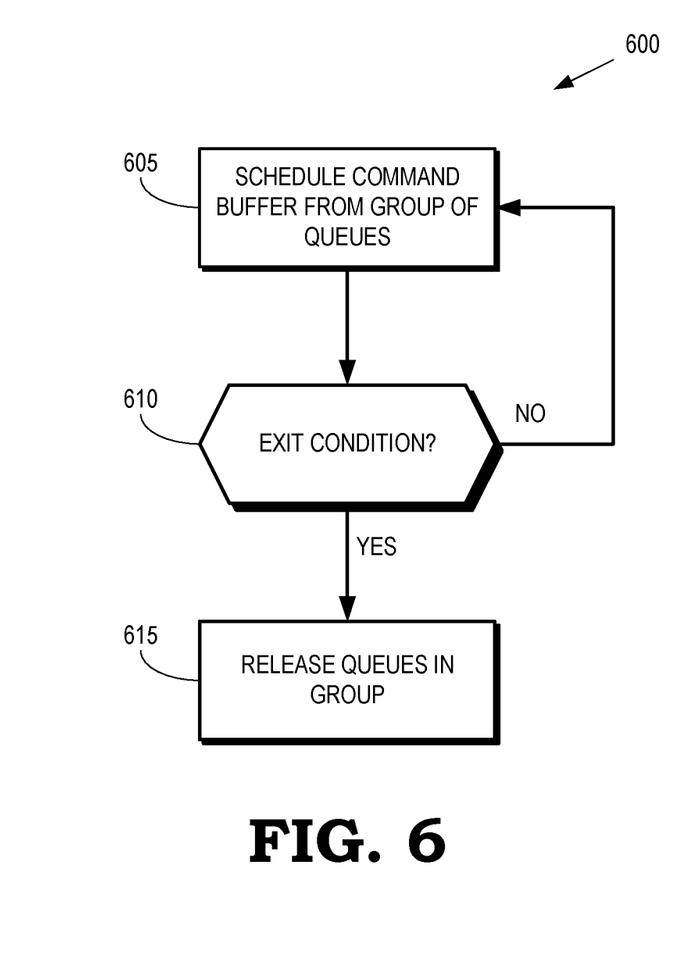
FIG. 6 is a flow diagram of a method of selectively releasing queues allocated to a group according to some embodiments.

FIG. 6 is a flow diagram of a method 600 of selectively releasing queues allocated to a group according to some embodiments. The method 600 is implemented in some embodiments of the GPU 110 shown in FIG. 1 and the GPU 200 shown in FIG. 2. In the illustrated embodiment, a group of queues has been allocated to an application for gang scheduling during a time quantum.

At block 605, a scheduler in the GPU schedules a command buffer from one of the queues in the group. At decision block 610, the scheduler in the GPU determines whether an exit condition has been satisfied. The exit condition includes, but is not limited to, expiration of the time quantum or the queues in the group becoming empty. For example, the exit condition can be satisfied if the time quantum expires regardless of whether any additional command buffers are available for scheduling from one of the queues in the group. For another example, the exit condition can be satisfied if all the queues in the group become empty and there are no command buffers available for scheduling, even if the time quantum has not yet expired. If the exit condition has not been satisfied, the method 600 flows back to block 605. If the exit condition is satisfied, the method 600 flows to block 615 and the queues in the group are released. Following block 615, the queues in the group are available to be allocated to one or more other applications.

Figure 7:
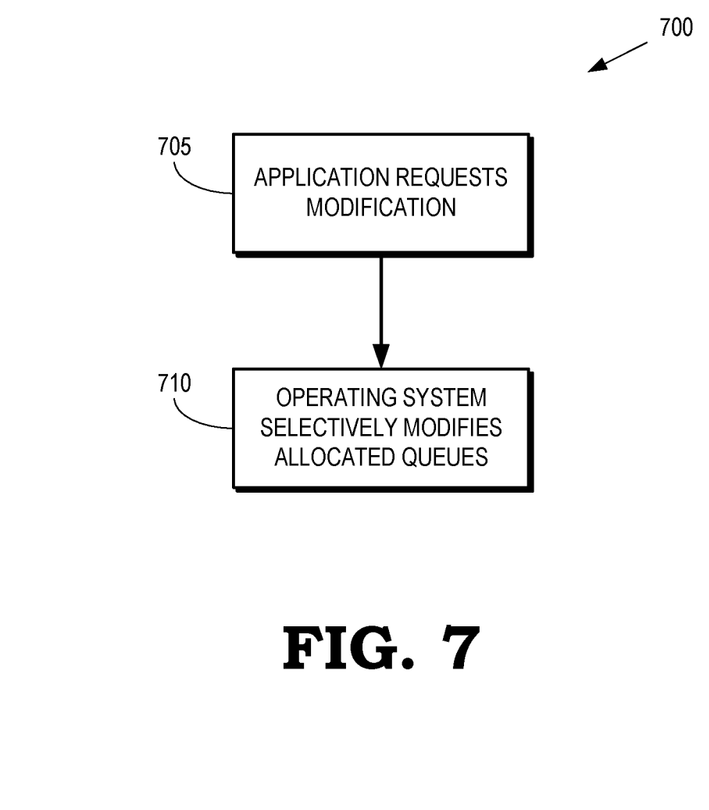
FIG. 7 is a flow diagram of a method of modifying characteristics of an allocation of queues to a group associated with an application according to some embodiments.

FIG. 7 is a flow diagram of a method 700 of modifying characteristics of an allocation of queues to a group associated with an application according to some embodiments. The method 700 is implemented in some embodiments of the GPU 110 shown in FIG. 1 and the GPU 200 shown in FIG. 2. In the illustrated embodiment, a group of queues has been allocated to an application for gang scheduling by a scheduler.

At block 705, a modification request is received by a kernel mode driver. Examples of modification requests include requests to remove one or queues from the group that is allocated to the application, move one or more of the queues from the group to another group that is allocated to a different application, change a priority associated with one or more of the queues or the group, and the like. At block 710, the kernel mode driver performs the requested modification. For example, the kernel mode driver removes one or more of the queues from the group. For another example, the kernel mode driver moves one or more of the queues from the group to another group associated with a different application. For yet another example, the kernel mode driver increases or decreases a priority associated with the queues or the group.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above can implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus, comprising:
a plurality of hardware queues configured to store command buffers prior to execution in respective pipelines of a plurality of pipelines;
a processor configured to, based on a request identifying a first group of hardware queues of the plurality of hardware queues from a first application, allocate at least one hardware queue of the first group of hardware queues to the first application;
and
a scheduler configured to gang schedule command buffers stored in the first group of hardware queues of the plurality of hardware queues for concurrent execution on respective pipelines.

2. The apparatus of claim 1, wherein:
the processor is configured to allocate queues of the plurality of hardware queues to applications.

3. The apparatus of claim 2, wherein:
the scheduler is configured to introduce predetermined delays between the command buffers stored in the first group of hardware queues.

4. The apparatus of claim 2, wherein:
the processor is configured to modify an allocation of the plurality of hardware queues in response to a modification request.

5. The apparatus of claim 4, wherein:
modifying the allocation of the plurality of hardware queues comprises reallocating a first queue from the first application to a second application.

6. The apparatus of claim 2, wherein:
the processor is to reconfigure priorities of at least one of the plurality of hardware queues in response to a reconfiguration request.

7. The apparatus of claim 1, wherein:
in response to receiving an interrupt that comprises an address indicating a location of a routine to be executed by a second plurality of pipelines, the scheduler is configured to use the address to access a data structure that identifies the routine.

8. The apparatus of claim 7, wherein:
in response to the scheduler accessing the data structure that identifies the routine, the routine is to generate a plurality of hardware queue allocation requests for a second group that differs from a first group of a command that generated the interrupt.

9. A method, comprising:
allocating, at a processor, a first plurality of queues from a first group of queues to a first application based on requests received from the first application each identifying the first group of queues, wherein the first plurality of queues is configured to store command buffers prior to execution in respective pipelines of a first plurality of pipelines; and
gang scheduling command buffers from the first plurality of queues in the first group of queues for concurrent execution on the respective pipelines of the first plurality of pipelines.

10. The method of claim 9, further comprising:
receiving, at the processor, a modification request from the first application; and
reallocating at least one queue of the first plurality of queues from the first application to a second application in response to receiving the modification request.

11. The method of claim 9, further comprising:
adding predetermined delays between the command buffers stored in the first plurality of queues.

12. The method of claim 9, further comprising:
deallocating the first plurality of queues from the first application in response to at least one of detecting expiration of a time quantum and detecting that the first plurality of queues is empty.

13. A method, comprising:
allocating, at a processor, a first queue of a first group of queues to a first application based on a first request received from the first application identifying the first group of queues, wherein the first queue is configured to store command buffers prior to execution in a first pipeline;
allocating, at the processor, a second queue of the first group of queues to the first application based on a second request received from the first application identifying the first group of queues, wherein the second queue is configured to store command buffers prior to execution in a second pipeline; and
gang scheduling a first group of command buffers from the first application to the first queue and the second queue for concurrent execution on the first pipeline and the second pipeline.

14. The method of claim 13, wherein gang scheduling the first group of command buffers comprises:
in response to a delay indication from the first application, introducing a predetermined delay between execution of a first command buffer scheduled to the first queue and a second command buffer scheduled to the second queue.

15. The method of claim 13, further comprising:
hierarchically gang scheduling a second group of command buffers from the first application to a third queue for concurrent execution with the first group of command buffers, wherein the second group of command buffers are to be executed on a third pipeline associated with the third queue.

16. The method of claim 15, wherein hierarchically gang scheduling the second group of command buffers comprises:
generating an interrupt in response to execution of a first command in a first command buffer in the first queue, wherein the interrupt comprises an address;
accessing a data structure using the address, wherein the data structure identifies a routine that generates a third registration request that comprises a second group identifier; and
allocating the third queue to the first application in response to the third registration request.

17. The method of claim 15, wherein hierarchically gang scheduling the second group of command buffers comprises:
gang scheduling a third group of command buffers from the first application to a fourth queue for concurrent execution with the first group of command buffers, wherein the third group of command buffers are to be executed on a fourth pipeline associated with the fourth queue.

18. The method of claim 13, further comprising:
deallocating the first queue from the first application in response to at least one of expiration of a time quantum and the first queue becoming empty, wherein the first queue is allocated to the first application for the time quantum.

* * * * *